United States Patent [19]

Manabe

[11] Patent Number: 5,555,041
[45] Date of Patent: Sep. 10, 1996

[54] PROJECTION APPARATUS

[75] Inventor: Yuji Manabe, Kamakura, Japan

[73] Assignee: Nikon Corporation, Tokyo, Japan

[21] Appl. No.: 415,454

[22] Filed: Apr. 3, 1995

[30] Foreign Application Priority Data

May 10, 1994 [JP] Japan ................................. 6-119741

[51] Int. Cl.$^6$ ................................................. G03B 21/28
[52] U.S. Cl. ................................ 353/98; 353/37; 353/97
[58] Field of Search ............................... 353/37, 98, 122, 353/97

[56] References Cited

U.S. PATENT DOCUMENTS

| | | | |
|---|---|---|---|
| 3,704,936 | 12/1972 | Gorkiewicz et al. | |
| 3,768,900 | 10/1973 | McLintic | 353/98 |
| 4,101,195 | 7/1978 | Korsch | 359/859 |
| 4,389,096 | 6/1983 | Hori et al. | |
| 5,108,172 | 4/1992 | Flasck | 353/37 |
| 5,381,197 | 1/1995 | Yoshida et al. | 353/98 |
| 5,394,204 | 2/1995 | Shigeta et al. | 353/37 |

*Primary Examiner*—William C. Dowling
*Attorney, Agent, or Firm*—Shapiro and Shapiro

[57] ABSTRACT

A projection apparatus includes a light source having a light emitting portion having a finite size, a concave reflecting mirror for condensing light from the light source, a condenser lens unit for converting the beam of light from the concave reflecting mirror into a substantially collimated beam of light, a light valve for reflecting the beam of light from the condenser lens unit and spatially modulating the beam of light on the basis of predetermined image information, and a projection optical system for imaging the spatially modulated beam of light on a predetermined surface, a lens unit for condensing the beam of light from the light valve in the inside off-illumination area of the beam of light formed by the concave reflecting mirror and the condenser lens unit being disposed between the light valve and the projection optical system, a light dividing element for directing the beam of light from the condenser lens unit to the light valve and for directing the beam of light condensed by the lens unit to the projection optical system being disposed between the condenser lens unit and the light valve.

10 Claims, 8 Drawing Sheets

PROJECTION APPARATUS

BACKGROUND OF THE INVENTION

1. Field of the Invention

This invention relates to a projection apparatus for projecting the image of a light valve onto a screen. Particularly, the present invention is suitable for a video projector.

2. Related Background Art

In recent years, so-called video projectors are known as apparatuses for projecting images onto a relatively large screen. These video projectors are divided broadly into one type comprising a construction of the phase modulation type in which the birefringence of liquid crystal and a polarizing optical system are combined together and one type comprising a construction of the scattering type in which liquid crystal having a light scattering property like polymer dispersion type liquid crystal and a schlieren optical system are combined together.

In such a video projector, it is common to apply a beam of illuminating light from a light source onto the image information display surface of a light valve and apply a beam of spatially modulated light onto a screen, which is a projection thereby projecting an image. It is required that the image be bright when the beam of illuminating light is applied onto the light valve with high illuminance (intensity) and is projected onto the screen.

Generally, to apply a beam of illuminating light onto a light valve with relatively high illuminance (intensity), the latter video projector of the scattering type is more advantageous than the former video projector of the phase modulation type in as much as it does not use polarized light and suffers little from the loss of the quantity of light. Various video projectors of this type have heretofore been proposed.

The video projectors of this scattering type include one type having a construction in which light regularly reflected by the image information display surface of a light valve is projected onto a screen and one type having a construction in which light scattered by the image information display surface of a light valve is projected onto a screen. The former is more convenient to obtain a bright image.

In such video projectors, use is generally made of white light sources emitting a beam of illuminating light of high brightness such as metal halide lamps and xenon lamps. A combination of these white light sources and, for example, a concave mirror such as an elliptical mirror, a parabolic mirror or a spherical mirror and a condenser lens or the like is generally used as light source means or an illuminating optical system.

Figure 1:
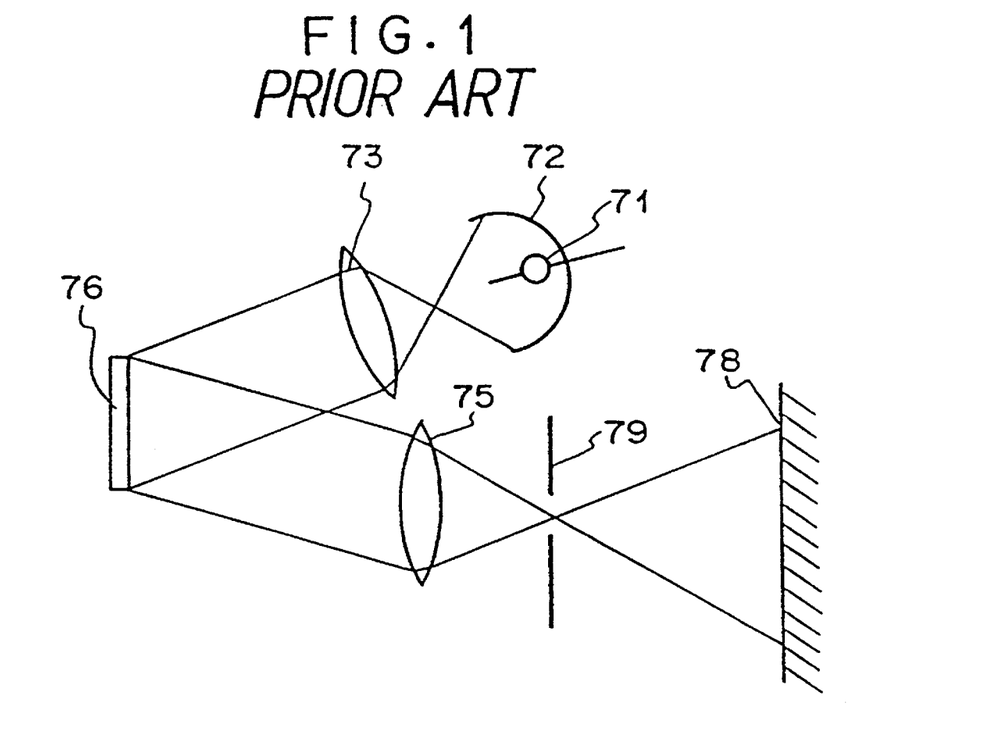
FIG. 1 schematically shows a conventional projection apparatus using a schlieren optical system.
Figure 2:
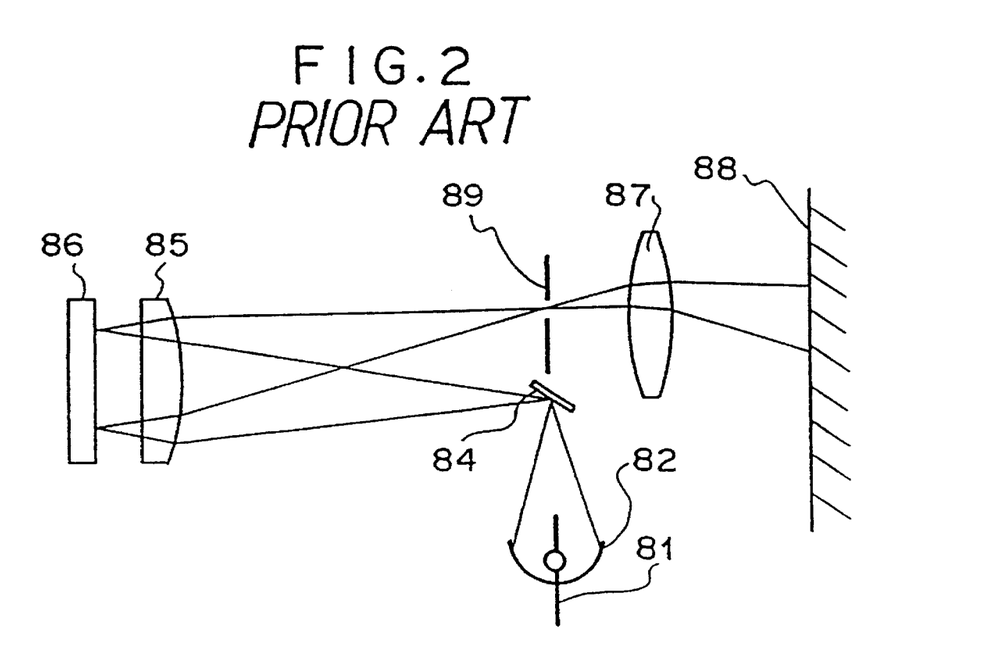
FIG. 2 schematically shows a conventional projection apparatus using a schlieren optical system.

Specific examples of the scattering type video projector according to the prior art are shown in FIGS. 1 and 2 of the accompanying drawings. Both of the scattering type video projectors shown in FIGS. 1 and 2 are of a type which utilizes regularly reflected light.

In FIG. 1, a beam of illuminating light emitted from a light source 71 is reflected and condensed by an elliptical mirror 72 and is substantially collimated by a condenser lens 73, whereafter it is applied so as to have any angle with respect to the image information display surface of a light valve 76. On the light valve 76, the applied beam of light is reflected and directed to a projection lens 75, and, at this time, this reflected beam of light is spatially modulated in conformity with image information.

The projection lens 75 causes the beam of light regularly reflected on the light valve 76 to be imaged on a screen 78.

A stop 79 is provided at a location whereat the beam of regularly reflected light is condensed by the projection lens 75. Light scattered by the image information display surface of the light valve 76 is eliminated as an unnecessary beam of light by the stop 79.

As described above, the beam of illuminating light applied to the light valve 76 by an illuminating optical system comprising the light source 71, the elliptical mirror 72, the condenser lens 73, etc. is spatially modulated in conformity with image information displayed on the image information display surface of the light valve 76, and thereafter is directed to a projection optical system comprising the projection lens 75, etc. and is projected onto the screen 78.

Such a projection apparatus of the scattering type must be designed such that the illuminating optical system and the projection optical system do not interfere with each other. Therefore, like the example of the prior art shown in FIG. 1, it is made into such a construction that the optical axes of the two optical systems are spatially inclined with respect to the image information display surface of the light valve. This has resulted in the problem that the image projected onto the screen is distorted.

In order to reduce such distortion of the image, there has also been proposed a projection apparatus in which respective members are disposed so as not to bend the optical path of a beam of light from image information to the utmost. FIG. 2 shows an example of a projection apparatus of such a construction.

Light emitted from a light source 81 is reflected and condensed by an elliptical mirror 82 and is reflected toward a light valve 86 by a mirror 84. A condensing lens 85 is provided between the mirror 84 and the light valve 86. The beam of light reflected by the mirror 84 is substantially collimated by this condensing lens 85, add thereafter enters the image information display surface of the light valve 86 at an angle nearly at a right angle. The beam of light which has entered the light valve 86 is reflected on the image information display surface of the light valve 86 and again enters the condensing lens 85, but, at this time, this reflected beam of light has been spatially modulated in conformity with image information.

The beam of light which has emerged from the condensing lens 85 enters a projection lens 87 through a stop 89. This stop 89 is for preventing the light scattered by the image information display surface of the light valve 86 from arriving at the projection lens 87. After scattered reflected light is eliminated as an unnecessary beam of light by this stop 89, an image is formed on a screen 88 by the projection lens 87.

However, even if, as shown in FIG. 2, the respective members are disposed so that the beam of illuminating light may enter the light valve at an angle approximate to a right angle, thereby causing the beam of illuminating light to enter at an angle approximate to a right angle, it is impossible to cause the beam of illuminating light to enter exactly at a right angle. Therefore it is unavoidable for the image to be distorted to a certain degree. Further, in the case of such a construction, the performance requirements of the projection optical system become very strict, and this gives rise to another problem that not only design is difficult, but also manufacture takes much time, which leads to an increase in cost.

It is also conceivable to provide a half mirror in the optical paths of the illuminating light and projected light, bend the optical path of the projected light or the reflected beam of light by 90°, cause the incident light to enter the light valve exactly perpendicularly thereto, and also cause the beam of spatially modulated light to be reflected in a perpendicular direction and projected onto a screen (parallel to the surface of the light valve). An example of such construction is shown in FIG. 3 of the accompanying drawings.

Figure 3:
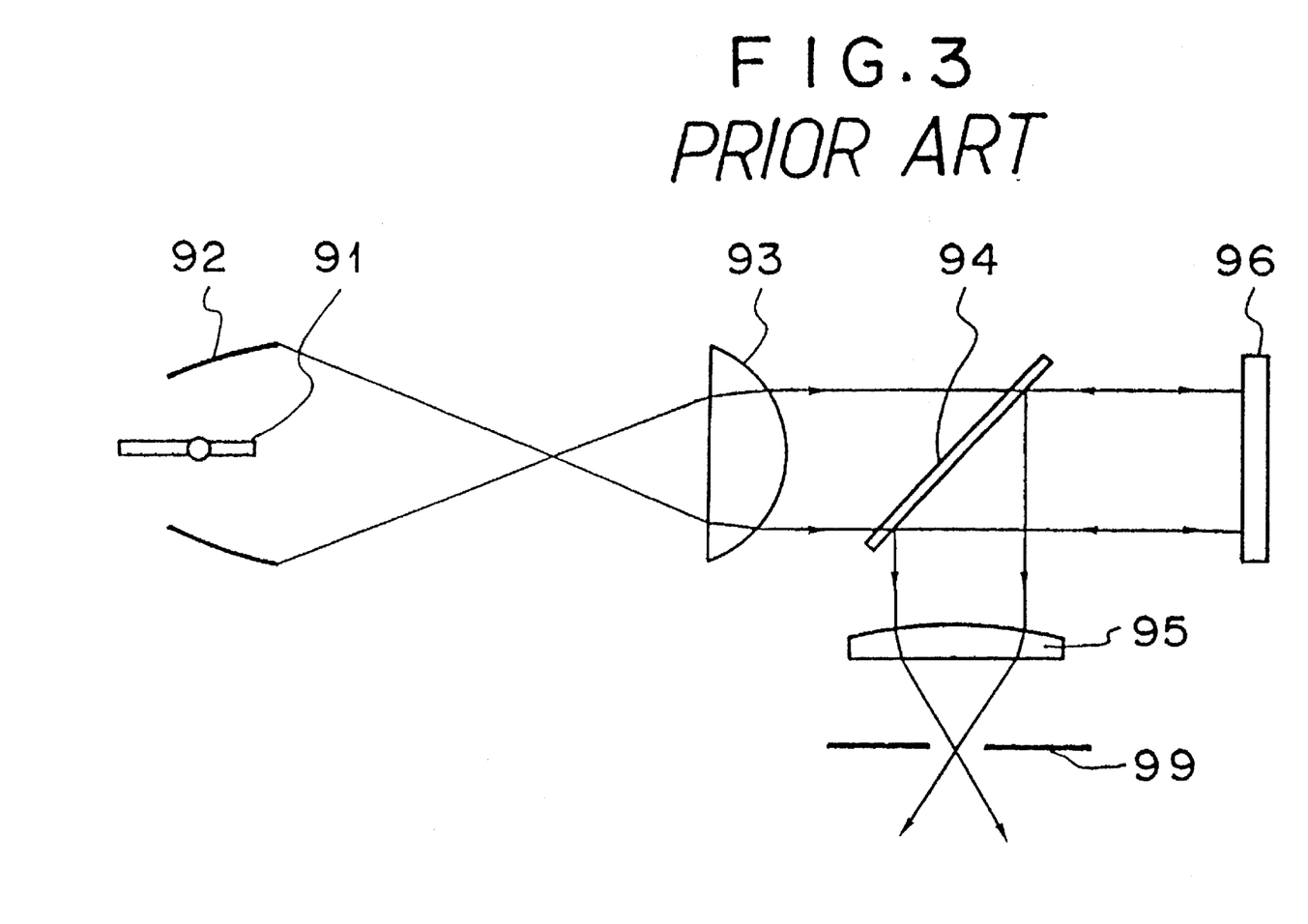
FIG. 3 schematically shows a conventional projection apparatus using a half mirror.

FIG. 3 shows a projection apparatus of such a construction that a beam of illuminating light is caused to enter a light valve 96 perpendicularly thereto. Between a condenser lens 93 and light valve means, a half mirror 94 is provided so as to keep an inclination of 45° with respect to the light valve means. The projector is designed such that one of the beams of light is reflected by the half mirror 94, whereby the optical path of the beam of illuminating light and the optical path of the reflected beam of light differ from each other.

Light emitted from a light source 91 is reflected and condensed by an elliptical mirror 92 and is substantially collimated by a condenser lens 93, and thereafter enters the half mirror 94. The half mirror 94 reflects part of the incident light but transmits part of the incident light therethrough. Thus, about a half of the quantity of light of the beam of light emitted from the flight source 91 arrives at the light valve 96.

The reflected beam of light reflected by the light valve 96 and spatially modulated at the same time enters the half mirror 94 again, and is half-transmitted (half-reflected) therethrough. Only the reflected beam of light is directed to a condensing lens 95 through a stop 99. Accordingly, the quantity of light finally arriving at a projection optical system becomes about a quarter of the quantity of light emitted from the light source 91, which means a considerable loss of the quantity of light, and this has led to the problem that an image projected onto a screen generally becomes dark.

SUMMARY OF THE INVENTION

So, it has an object of the present invention to provide a projection apparatus which has excellent image projecting characteristics. It is also an object of the present invention to provide a projection apparatus in which it is difficult for distortion to occur in a projected image and an illuminating optical system and a projection optical system do not interfere with each other and which suffers little from the loss of the quantity of light. It is also an object of the present invention to provide a projection apparatus which is simple in construction and requires very little labor for the assembling work.

In order to achieve the above objects, a projection apparatus according to an embodiment of the present invention includes:

a light source having a light emitting portion having a finite size;

a concave reflecting mirror for condensing light from said light source;

a condenser lens unit for converting the beam of light from said concave reflecting mirror into a substantially collimated beam of light;

a light valve for reflecting the beam of light from said condenser lens unit and spatially modulating said beam of light on the basis of predetermined image information;

a projection optical system for imaging the spatially modulated beam of light on a predetermined surface;

a lens unit for condensing the beam of light from said light valve in the inside off-illumination area of the beam of light formed by said concave reflecting mirror and said condenser lens unit being disposed between said light valve and said projection optical system; and a light dividing element for directing the beam of light from said condenser lens unit to said light valve and for directing the beam of light condensed by said lens unit to said projection optical system and being disposed between said condenser lens unit and said light valve.

Also, in order to achieve the above objects, a projection apparatus according to another embodiment of the present invention includes:

a light source having a light emitting portion having a finite size;

a concave reflecting mirror having a non-reflecting area of a predetermined shape;

a condenser lens unit;

a light dividing element having a transmitting area and a reflecting area;

a reflection type light valve;

a lens unit; and a projection optical system;

the light from said light source being directed to said reflection type light valve via said concave reflecting mirror, said condenser lens unit, said light dividing element and said lens unit in succession, the beam of light reflected by said reflection type light valve being directed to a screen through said lens unit and said projection optical system in succession;

said light dividing element being disposed so that one of said transmitting area and said reflecting area may be at a position substantially conjugate with said non-reflecting area of said concave reflecting mirror;

the beam of light from said reflection type light valve that has passed through said lens unit being condensed in said one area.

In the present invention having the construction as described above, the light from the light emitting portion of the light source is reflected and condensed by the concave reflecting mirror, whereafter it is condensed by the condenser lens unit and illuminates the reflection type light valve in the state of a substantially collimated beam of light.

At this time, in the beam of light travelling from the condenser lens group toward the reflection type light valve, not all rays of light travel in parallelism. That is, in said beam of light, there are also present rays of light travelling while converged or diverging.

Heretofore, however, it has been the only object to apply a beam of light uniformly and efficiently on the reflection type light valve. Therefore, the behavior of the beam of light in the optical path as described above has posed no problem. Accordingly, heretofore, the design of the illuminating optical system has been made with only the applied state of the illuminating light on the reflection type light valve taken into account.

Now, the applicant has found that an area through which light does not pass (hereinafter referred to as the inside off-illumination area) is created in the interior of the beam of light emerging from the condenser lens group. According to the applicant's analysis, this inside off-illumination area is created by the size of the light emitting portion, the design condition of the concave reflecting mirror (for example, the focal length of the concave reflecting mirror) and the presence of a hole or the like formed in the concave reflecting mirror.

Heretofore, the behavior of the rays of light in the beam of light travelling from the condenser lens group toward the reflection type light valve has been neglected, but in the present invention, this inside off-illumination area is positively utilized.

Figure 4:
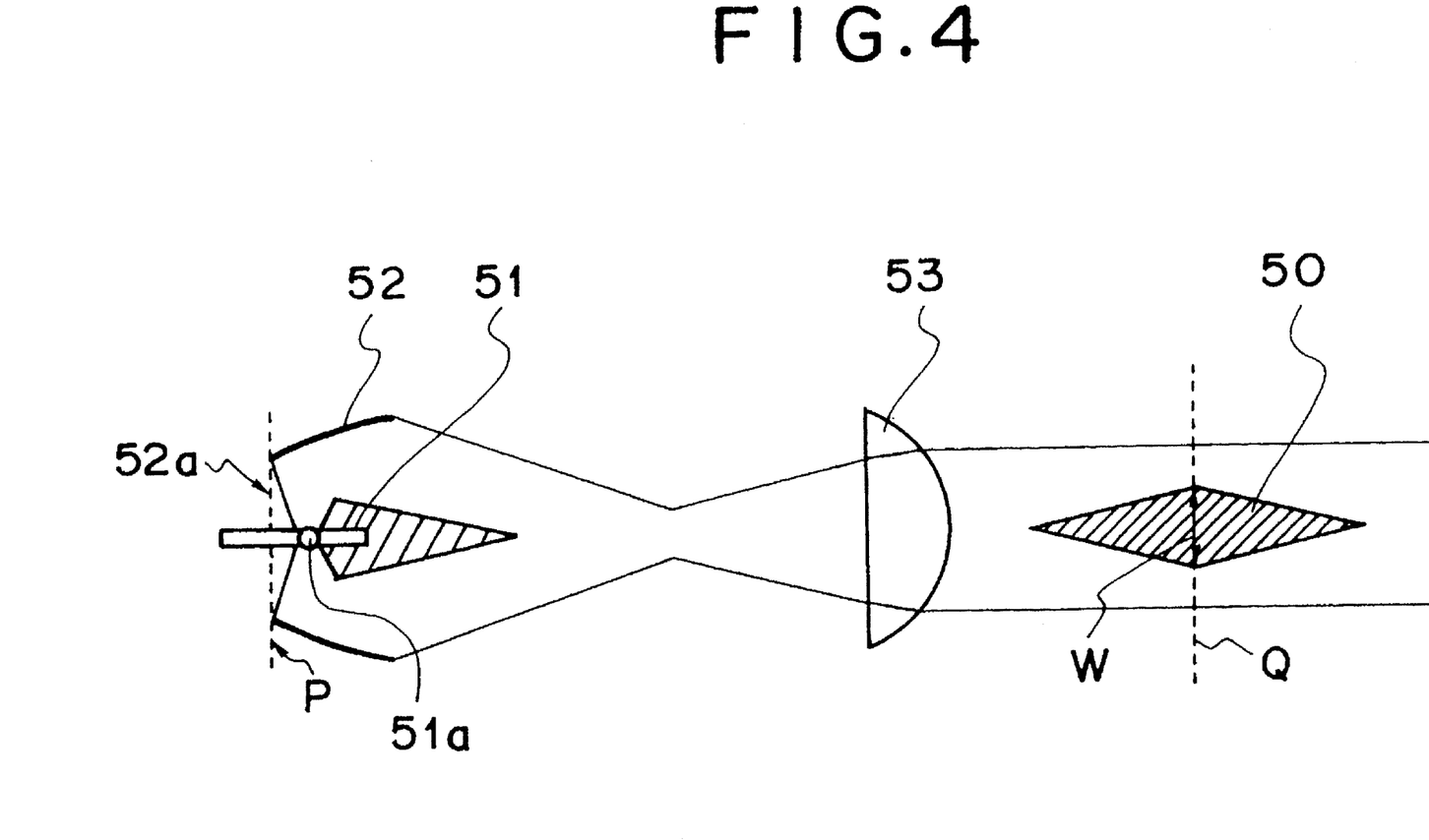
FIG. 4 shows a beam envelope of light when an inside off-illumination area is formed.
Figure 5:
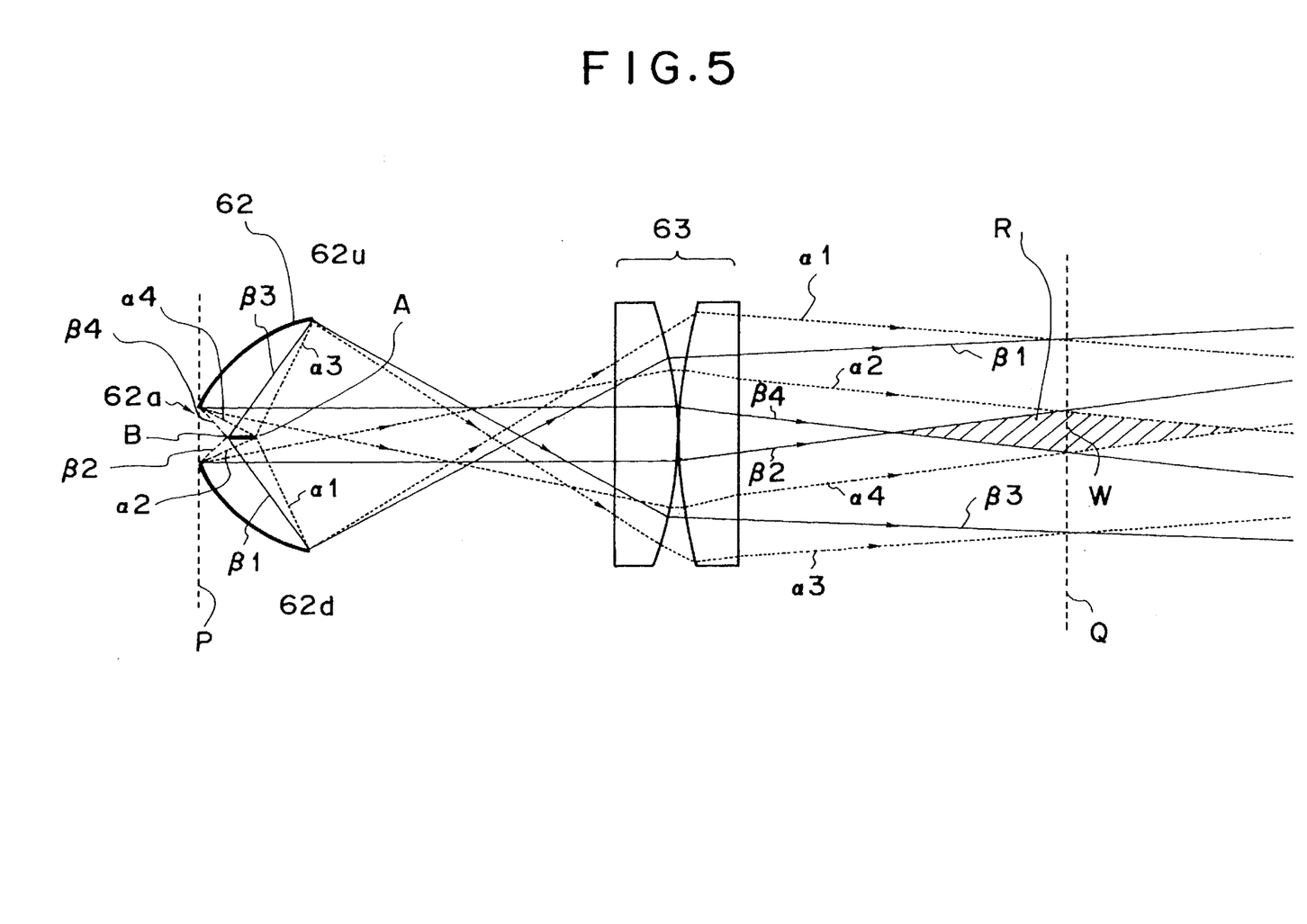
FIG. 5 shows the state of travel of rays of light when an inside off-illumination area is formed.

The manner in which this inside off-illumination area is formed in the optical path of the beam of illuminating light will now be specifically described with reference to FIGS. 4 and 5 of the accompanying drawings. FIGS. 4 and 5 show cross-sectional views on a plane containing the optical axis of the illuminating optical system as described above. FIG. 4 is an illustration showing the beam envelope of illuminating light when use is made of a light source having a predetermined size (with respect to the direction of the optical axis). FIG. 5 shows an illuminating optical system similar to that of FIG. 4, but is an illustration showing the paths of travel of the outermost ray of light and the innermost ray of light in the beam of illuminating light.

In FIG. 4, a light source 51 has a light emitting portion 51a having a predetermined size with respect to the direction of the optical axis, and is introduced into an elliptical mirror 52 through an introduction hole 52a formed in the bottom portion of the elliptical mirror 52 (the vertex portion of the ellipse, i.e., the left portion as viewed in FIG. 4). The light emitting portion 51a is substantially aligned with a first focal position of the elliptical mirror 52, and light emitted therefrom is reflected by the elliptical mirror 52 and enters a condenser lens 53.

A beam of light from the light source 51 is reflected by the elliptical mirror 52 so as to be converged near a second (the other) focus of the elliptical mirror 52. However, the light source 51 is such that the light emitting portion thereof is not like an ideal point, but has a certain degree of size (at least a length along the direction of the optical axis) and thus, the reflected beam of light from the elliptical mirror 52 is not converged at a point, but is converged (forms a beam waist) with a certain degree of expanse.

The beam of light then diverges from this position whereat it has been converged, and enters the condenser lens 53. The condenser lens 53 substantially collimates this divergent beam of light, but actually it is designed to substantially collimate the light from the ideal first focal position and to cause the light from the other portion than the first focal position to be uniformly applied onto the light valve.

Therefore, rays of light are not always uniformly distributed in the optical path of the beam of illuminating light, but it has been found that a portion through which the light does not pass in the beam of light is created in a predetermined portion in that optical path. The portion through which the light does not pass in the beam of light is indicated as the inside off-illumination area 50. Since FIG. 4 (and FIG. 5) are cross-sectional views in which the illuminating optical system is divided by a plane containing the optical axis, the cross-section of the inside off-illumination area 50 is of a shape like a lozenge as shown, but actually it is formed into the shape of a rotational body having a lozenge-shaped cross-section.

FIG. 5 shows the travel of rays of light in this illuminating optical system. In this figure, the optical paths of rays of light $\alpha_1$–$\alpha_4$ from a location A nearest to a condenser lens 63 in the light emitting portion are indicated by dotted lines, and the optical paths of rays of light $\beta_1$–$\beta_4$ from a location B farthest from the condenser lens 63 are indicated by solid lines.

Also, among the rays of light from the location A, $\alpha_1$ and $\alpha_3$ indicate the paths of travel of rays of light reflected by the open end portion in an elliptical mirror 62 which is adjacent to the condenser lens 63, and $\alpha_2$ and $\alpha_4$ indicate the paths of travel of rays of light reflected by the peripheral end portion of an introduction hole 62a in the elliptical mirror 62 which is located on the opposite side from the condenser lens 63.

Likewise, among the rays of light from the location B, $\beta_1$ and $\beta_3$ indicate the paths of travel of rays of light reflected by the open end portion in the elliptical mirror 62 which is adjacent to the condenser lens 63, and $\beta_2$ and $\beta_4$ indicate the paths of travel of rays of light reflected by the peripheral end portion of an introduction hole 62a in the elliptical mirror 62 which is located on the opposite side from the condenser lens 63.

Among the rays of light from the location A, a beam of light travelling to the upper portion 62u of the elliptical mirror and reflected thereby is once reflected in the direction of the optical axis and is converged, whereafter it enters the condenser lens 63 while diverging again and is substantially collimated. This substantially collimated beam of light becomes a beam of light restricted between the rays of light $\alpha_3$ and $\alpha_4$ in FIG. 5.

Likewise, among the rays of light from the location A, a beam of light travelling to the lower portion 62d of the elliptical mirror and reflected thereby is once converged, whereafter it enters the condenser lens 63 while diverging again and is substantially collimated. This substantially collimated beam of light becomes a beam of light restricted between the rays of light $\alpha_1$ and $\alpha_2$ in FIG. 5.

Similarly, regarding the rays of light from the location B, a beam of light travelling to the upper portion 62u of the elliptical mirror and reflected thereby becomes a beam of light restricted between the rays of light $\beta_3$ and $\beta_4$ in FIG. 5, and a beam of light travelling to the lower portion 62d of the elliptical mirror and reflected thereby becomes a beam of light restricted between the rays of light $\beta_1$ and $\beta_2$ in FIG. 5.

It is seen from the result of the pursuit of these rays of light that whatever rays of light reflected by the elliptical mirror 62 may be taken, there is no ray of light passing through the hatched area R (inside off-illumination area) in FIG. 5. This area is an area corresponding to the inside off-illumination area 50 in FIG. 4, and in this area R, the beam of illuminating light does not travel (does not exist).

Further, the image of the location P of the introduction hole 62a of the elliptical mirror 62 is formed by the condenser lens 63 at a location Q whereat the width w of this inside off-illumination area R (the width in a direction orthogonal to the optical axis) becomes greatest. That is, the location Q whereat the width w of the inside off-illumination R becomes greater and the location P of the introduction hole 62a of the elliptical mirror 62 is in an optically conjugate positional relationship with the condenser lens 63.

In other words, this inside off-illumination area R is a shadow created by such factors as the portion (introduction hole 62a) of the elliptical mirror which does not reflect the light from the light emitting portion and the size of the light emitting portion itself, and is created in the beam of illuminating light about a location substantially conjugate with the location of the introduction hole 62a. This inside off-illumination area R has its shape (the three-dimensional shape or the size of the area) varied also by the shape of the light emitting portion of the light source, such as the length of the inside off-illumination area R along the direction of the optical axis will become great if the length of the light emitting portion along the direction of the optical axis becomes small.

In the foregoing, for the simplicity of description, the case of only the meridional cross-section of the illuminating optical system has been described in a plane-like fashion.

This, however, applies also to a case where the matter is spatially considered and therefore, of course, among the rays of light reflected by any portion of the elliptical mirror, there is no rely of light passing through the three-dimensional inside off-illumination area R indicated by hatching.

Further, it is apparent that such an inside off-illumination area is created not only by an elliptical mirror but also by other concave reflecting mirrors depending on the disposition of the light emitting portion. For example, in a parabolic mirror, light created from the focal position thereof is reflected by the parabolic mirror and becomes a parallel beam of light, but in a light emitting portion having a finite size, the light created is not always only light created from the focal position and therefore, not all rays are collimated. Therefore, in order that the light from the light emitting portion may be effectively utilized, it is often the case that the light emitting portion is deviated from the focal position and the reflected light from the parabolic mirror is used as parallel light or as convergent light. Even in such a case, an inside off-illumination area through which light does not travel is created in the optical path of the beam of illuminating light.

Depending on the kinds and disposition conditions of the concave reflecting mirror and the light emitting portion, some projectors may not have area through which a beam of light does not completely travel, but there is an area in which the density of the beam of light is very small, and this can also considered to be an inside off-illumination area.

In the present invention, the reflected light from the light valve is condensed in the inside off-illumination area by the lens group disposed between the light valve and the projection optical system. Via a light dividing element disposed in this inside off-illumination area, the light condensed by the lens group can be directed 45° the projection optical system. At this time, the separation of the optical paths of the illuminating optical system and projection optical system is done by the utilization of the inside off-illumination area. Therefore, the reflected light from the light valve and the illuminating light from the condenser lens group can be separated from each other without any influence such as the loss of the quantity of light being imparted thereto.

If for example, a reflecting portion is provided in this inside off-illumination area, the reflected light from the light valve means will be reflected and deflected by this reflecting portion and be directed to an optical path differing from the illuminating optical system. Therefore, if the projection optical system is disposed in the route of the deflected light, the illuminating optical system and the projection optical system can share a portion with each other and yet can divide the optical path. In this case, the reflecting portion is provided in the optical path of the illuminating optical system, but the beam of illuminating light does not travel there (or is very little) and therefore, any damage such as the loss of the quantity of light, is not caused to the beam of illuminating light directed to the light valve.

Also, discretely from this, it is possible to adopt a construction in which a reflecting portion is provided in the other portion of the optical path of the illuminating light that is, a portion other than the inside off-illumination area (the inside off-illumination area portion being a transmitting portion), and a beam of light reflected thereby is directed to the light valve means. In this case, the reflected beam of light from the light valve means is separated from the optical path of the illuminating optical system through the transmitting portion.

Thus, according to the present invention, the illuminating optical system and the projection optical system can be formed, by the utilization of the inside off-illumination area in the beam of illuminating light, so as not to interfere with each other. Accordingly, the light valve can be illuminated from a direction perpendicular thereto and the reflected beam of light from the light valve can be directed in the perpendicular direction and therefore, an undistorted image can be projected onto the screen. Further, even if the optical path is partly used in common like this, the projection of an image can be effected without causing any loss of the quantity of light of the beam of illuminating light or the reflected beam of light and therefore, a bright image can be obtained.

Also, in the present invention, it is preferable that the concave reflecting mirror be an elliptical mirror. This construction has the advantage that designing is easiest when constructing the illuminating optical system. Further, this construction has the advantage that the inside off-illumination area of the beam of light can be clearly set. That is, when an elliptical mirror is used, no ray of light travels to the inside off-illumination area.

Besides an elliptical mirror, a parabolic mirror, a spherical mirror or the like can be used as the concave reflecting mirror, but since the light emitting portion of the light source has a finite size, it becomes difficult to grasp the state of travel of rays of light with any other concave reflecting mirror than an elliptical mirror, and this is not preferable. For example, in the case of a parabolic mirror, a beam of light from the focal position thereof can be made into a parallel beam of light, but beams of light from the other portions from the focal position become a divergent beam of light and a convergent beam of light.

Further, when any concave reflecting mirror other than an elliptical mirror is used, it is necessary to do the auxiliary work of deviating the position of the light emitting portion of the light source, and such design is complicated and cumbersome and the positioning of the light emitting portion is also cumbersome, and this is not preferable.

Also, in the present embodiment, it is preferable that the light dividing element be disposed so as to form an inclination of 45° with respect to the light valve. In the case of such construction, the beam of light reflected by the light valve is deflected by 90° and travels toward the projection optical system, or the beam of light from the condenser lens group is deflected by 90° and travels toward the light valve. Accordingly, the beam of light entering the light valve or reflected by the light valve becomes perpendicular to the light valve, and the optical axis of the projection optical system and the optical axis of the illuminating optical system are orthogonal to each other.

Therefore, an image becomes capable of being projected without being distorted and in addition, it is possible to make the structure of the optical systems of the entire projection apparatus simple and easy to assemble.

Also, in the present invention, it is preferable to adopt a construction in which the light dividing element has a reflecting area and a transmitting area and the reflecting area is disposed at a location substantially conjugate with the hole in the concave reflecting mirror.

In this construction, the beam of light emitted from the light source arrives at the light dividing element provided in the illuminating optical system through the concave reflecting mirror and the condenser lens group, and is transmitted through the transmitting area of the light dividing element and travels toward the light valve.

At this time, the reflecting area provided in a portion of the light dividing element is positioned in 10 the inside off-illumination area of the beam of light from the condenser lens group because this reflecting area is disposed at a location substantially conjugate with the hole in the concave reflecting mirror (elliptical mirror). Accordingly, the beam of light from the condenser lens group is not intercepted by this reflecting area but all of it is transmitted through the transmitting area of the light dividing element and arrives at the light valve means. Therefore, it never happens that the beam of illuminating light is eclipsed or vignetted in the illuminating optical system and causes any loss of the quantity of light.

This beam of light then arrives at the light valve and is reflected by the image information display surface of the light valve and is spatially modulated, and passes through the lens group provided on the exit side of the light valve and is condensed in the inside off-illumination area. Since the reflecting area of the light dividing element is disposed at the position whereat the beam of light is condensed, the beam of light passed through the lens group is all reflected by this reflecting area and is directed to the projection optical system. That is, the optical paths can be separated without involving any loss of the quantity of light.

Of course, the reflecting area of the light dividing element will not affect the beam of illuminating light if it is of a size within a range which can fall within the inside off-illumination area, but can reflect all of the reflected beam of light if it is larger than the diameter of the beam of light converged by the lens group. Accordingly, the setting of the size of the inside off-illumination area and the designing of the lens group can be done in conformity with the light dividing element. Also, the regularly reflected light from the light valve is condensed here and thus, the scattered reflected light is not directed to this reflecting portion but is eliminated.

Also, in the present invention, it is preferable to adopt a construction in which the light dividing element has a reflecting area and a transmitting area and the transmitting area is disposed at a location substantially conjugate with the hole in the concave reflecting mirror.

In this case, the beam of light from the light source is reflected by the reflecting area of the light dividing element through the concave reflecting mirror and the condenser lens group, whereafter it has its optical path deflected (e.g. by 90°) and travels toward the light valve means.

Since the transmitting area of the light dividing element is disposed at a location substantially conjugate with the hole in the concave reflecting mirror with respect to the condenser lens group, this transmitting area is located in the inside off-illumination area of the beam of light from the condenser lens group. Accordingly, the entire beam of light from the condenser lens group is reflected by the light dividing element and arrives at the light valve. Therefore, it never happens that the beam of illuminating light is eclipsed or vignetted in the illuminating optical system and causes any loss of the quantity of light.

On the other hand the beam of light reflected and spatially modulated by the light valve is condensed in the inside off-illumination area by the lens group provided on the exit side of the light valve. The transmitting area of the light dividing element is located at this condensed position and thus, the beam of light from the light valve passed through the lens group passes through this transmitting area and is directed to the projection optical system and is projected onto the screen. Of course, the size of the transmitting area is not particularly restricted if it is within a range which falls within the inside off-illumination area and is larger than the diameter of the beam of light condensed by the lens group.

DESCRIPTION OF THE PREFERRED EMBODIMENTS

Some embodiments of the present invention will hereinafter be described with reference to the drawings.

Figure 6:
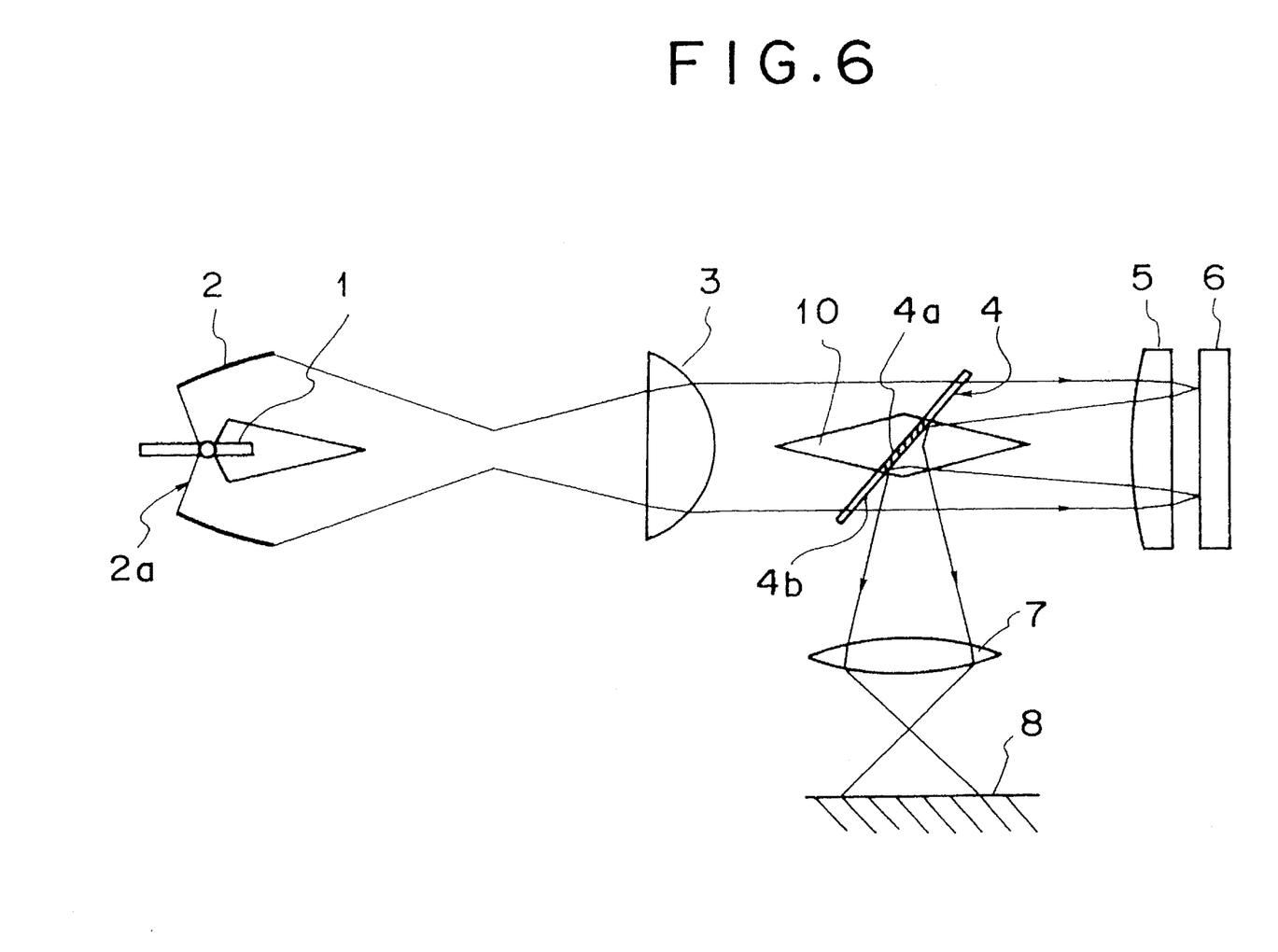
FIG. 6 schematically shows the construction of a projection apparatus according to a first embodiment of the present invention.

FIG. 6 schematically shows the construction of a projection apparatus according to a first embodiment of the present invention. The embodiment shown in FIG. 6 is an example of the construction when an optical path selecting member (see FIG. 7) having a reflecting portion comprising a metallic mirror provided on a portion of a transparent glass substrate is used as a light dividing element. An illuminating optical system is provided with a light source 1, an elliptical mirror 2 and a condenser lens 3, and is further provided with an optical path selecting member 4 in the optical path of the illuminating optical system.

In this first embodiment, a metal halide lamp of which the light emitting portion is linear and has a size of about 5 mm along the direction of the optical axis, is used as the light source 1. Of course, the metal halide lamp is not restrictive, and use may be made, for example, of a light source having a light emitting portion having a finite size, such as a xenon lamp.

In this first embodiment, the light source 1 is disposed with its light emitting portion roughly aligned with the focal position of the elliptical mirror 2. In the light emitting portion of the light source 1, light emitted from the focal position of the elliptical mirror 2 travels toward the elliptical mirror 2, is reflected there and becomes a convergent beam of light travelling toward a second focal position. The light then converges at a point (the second focal position) on the optical axis of the elliptical mirror 2, but light emitted other than from the focal position of the elliptical mirror 2 does not converge at this second focal position but forms a beam waist having a certain degree of expanse about the second focus.

This beam of illuminating light forms a beam waist, after which it travels while diverging again and enters the condenser lens 3. The condenser lens 3 is disposed so that the focal position thereof may coincide with the beam waist forming position, and converts the beam of illuminating light reflected by the elliptical mirror 2 into a substantially parallel beam of light and causes it to emerge therefrom.

The beam of illuminating light emerging from the condenser lens 3 is transmitted through the optical path selecting member 4 disposed on the optical path thereof and is applied to the image information display surface of a light valve 6. In this beam of illuminating light, a rotational body-shaped inside off-illumination area 10 having a lozenge-shaped cross-section along the optical axis is created substantially about a location substantially conjugate with an introduction hole 2a in the elliptical mirror 2 with respect to the condenser lens 3.

Accordingly, in the first embodiment, the optical path selecting member 4 is disposed so that the reflecting portion 4a (see FIG. 7) of the optical path selecting member 4 may fall within the inside off-illumination area 10, whereby it is designed such that the beam of illuminating light is not intercepted on its way but arrives at the light valve 6.

The light valve 6 partly varies the beam of illuminating light applied thereto with predetermined intensity on the image information display surface in conformity with an input signal and spatially modulates a part of the beam of light reflected thereby. Available light valves 6 include, for example, one provided with an image display surface designed to deform the surface of oil film or metal film by electronic means, or one provided with an image display surface formed of an electro-optical crystal such as liquid crystal, but these constructions are not restrictive.

The beam of light reflected by the light valve 6 is spatially modulated in conformity with image information and creates scattered reflected light and regularly reflected light. A condensing lens 5 condenses the regularly reflected light from the light valve 6 in the inside off-illumination area 10. The beam of illuminating light is also transmitted through this condensing lens 5 and applied to the light valve 6 Therefore, of course, taking into account that the condensing lens affects the illuminating light and the reflected light, the condensing position thereof is adjusted so as to coincide with the reflecting portion 4a of the optical path selecting member 4 installed in the inside off-illumination area 10.

In this inside off-illumination area 10, as previously described, there is provided the reflecting portion 4a of the optical path selecting member 4, and this reflecting portion 4a is disposed so as to have an inclination of 45° with respect to the light valve 6. Therefore, the reflected beam of light condensed by the condensing lens 5 is condensed on this reflecting portion and reflected there, and has its optical path bent by 90° and is directed to a projection lens 7, and forms an image on a screen 8. Of course, the projection optical system, including the condensing lens 5, is determined so that an image may be formed on a screen 8.

Figure 7:
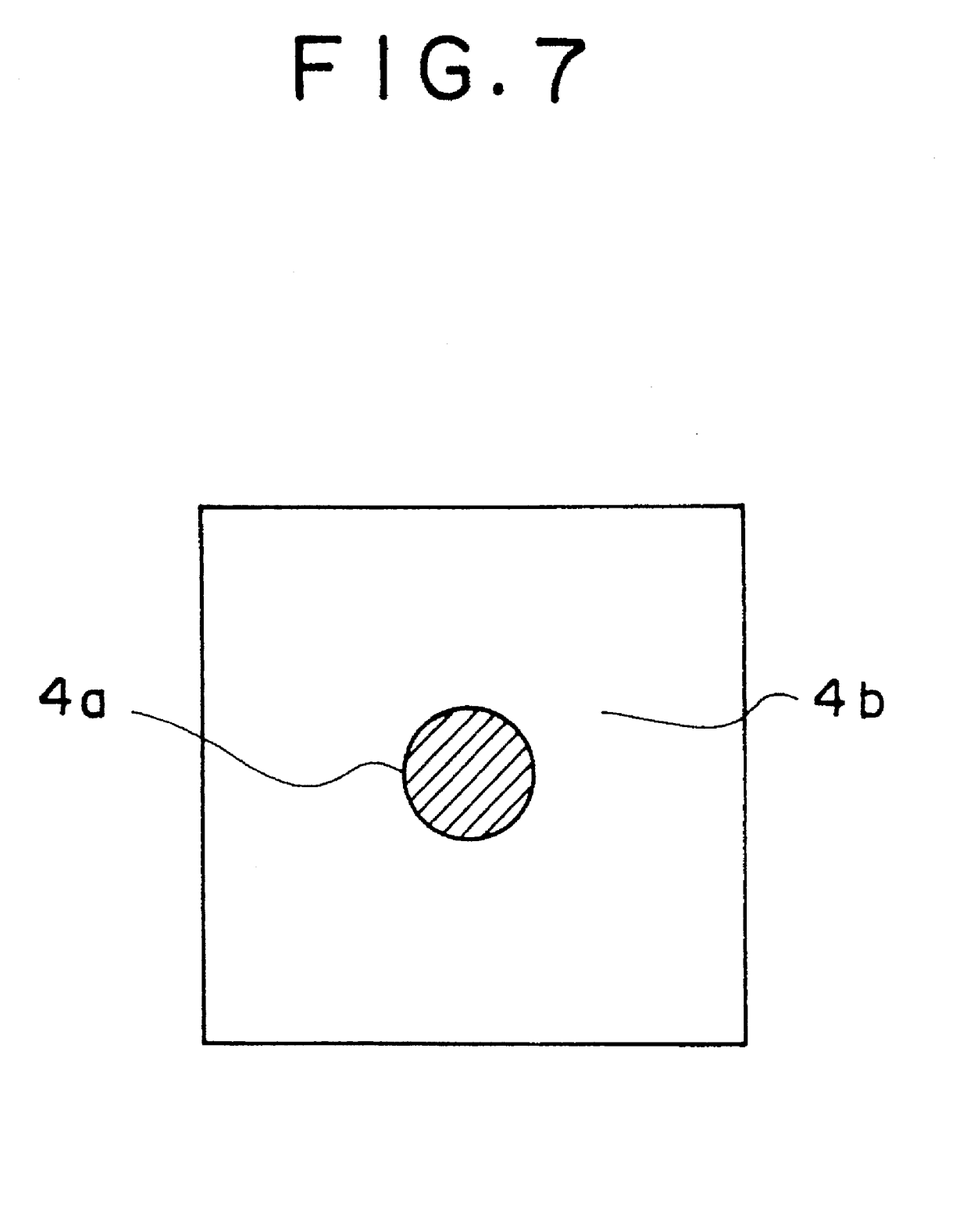
FIG. 7 is a plan view showing the construction of an optical path selecting member in the first embodiment of the present invention.

The construction of the optical path selecting member 4 used in the first embodiment is schematically shown in FIG. 7. In this embodiment, a reflecting portion 4a formed by the evaporation of a metal is provided on the central hatched portion of a transparent glass substrate 4b. The size of this reflecting portion 4a is determined so that when incorporated into the projection optical system, it may fall within the inside off-illumination area determined from the design conditions of the illuminating optical system. Further, the power of the condensing lens 5 is determined in accordance with the size of this reflecting portion 4a.

In the above-described first embodiment shown in FIG. 6, there is shown an example of the construction when the optical path of the reflected beam of light from the light valve means is bent by 90°. This is because 90° is the angle best suited for preventing the distortion of the image on the screen, and further, this angle is selected in consideration of the advantage that the designing of the apparatus is easy. However, the present invention is not restricted to this angle.

Figure 8:
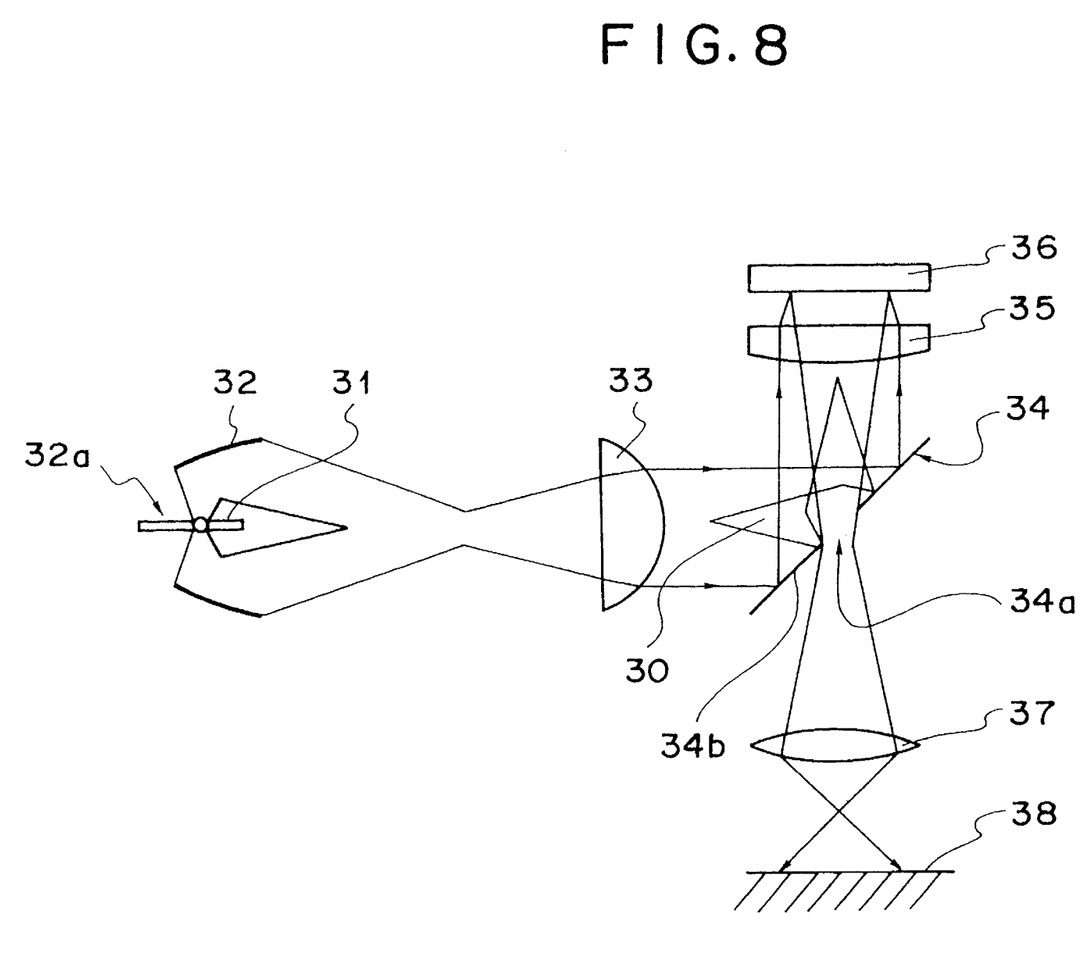
FIG. 8 schematically shows the construction of a projection apparatus: according to a second embodiment of the present invention.

A second embodiment shown in FIG. 8 is an example of the construction when the optical path of the reflected beam of light is not bent, and as the optical path selecting member, use is made of one (see FIG. 9) having an opening portion as a light transmitting portion provided on a portion of a metallic mirror which is a light-reflective substrate. Again in this second embodiment, as in the aforedescribed first embodiment, the illuminating optical system is provided with a light source 31, an elliptical mirror 32 and a condenser lens 33, and is further provided with an optical path selecting member 34 in the optical path of the illuminating optical system.

Also, as the light source 31, use is made of a linear metal halide lamp of which the light emitting portion has a size of about 5 mm with respect to the direction of the optical axis. Of course, the light source is not limited to the metal halide lamp, but may be a light source having a light emitting portion having a finite size, such as a xenon lamp.

The construction of the light source means is substantially similar to that in the first embodiment. When the light source 31 is disposed with its light emitting portion roughly aligned with the focal position of the elliptical mirror 32, light emitted from the focal position of the elliptical mirror 32 travels toward the elliptical mirror 32 and is reflected there and becomes a convergent beam of light, and becomes a beam of light having a beam waist formed near a second focal position of the elliptical mirror 32, as in the first embodiment.

The beam of illuminating light forms a beam waist, after which it travels while diverging again and enters the condenser lens 33. The condenser lens 33 has its focal position aligned with the beam waist forming position, and converts the beam of light reflected by the elliptical mirror 32 into a substantially collimated beam of light and causes it to emerge therefrom.

The beam of illuminating light emerging from the condenser lens 33 is reflected by the optical path selecting member 34 disposed on the optical path thereof with an inclination of 45° with respect to the optical axis of the condenser lens 33 (the image display surface of a light valve 36), and has its optical path bent by 90° and is applied to the light valve 36.

Also in the optical path of the beam of illuminating light in the present embodiment, a rotational body-shaped inside off-illumination area 30 having a lozenge-shaped cross-section along the optical axis is created at a location substantially conjugate with an introduction hole 32a in the elliptical mirror 32 with respect to the condenser lens 33. Accordingly, in the second embodiment, the optical path selecting member 34 is disposed so that the opening portion 34a of the optical path selecting member 34 may fall within this inside off-illumination area 30.

The light valve 36 partly varies the beam of illuminating light emitted with predetermined intensity, in conformity with an input signal, and spatially modulates a part of the beam of light reflected thereby. As this light valve 36, there is include, for example, one provided with an image display surface designed to deform the surface of oil film or metal film by electronic means, or one provided with an image display surface comprising an electro-optical crystal such as liquid crystal, but these constructions are not restrictive.

The beam of light reflected by the light valve 36 is spatially modulated by the image information display surface of the light valve in conformity with image information, and a condensing lens 35 condenses this spatially modulated regularly reflected beam of light (at the location of the opening; portion 34a of the optical path selecting member) in the inside off-illumination area 30 in the beam of illuminating light.

As previously described, the opening portion 34a of the optical path selecting member 34 is provided so as to fall within the inside off-illumination area 30 and therefore, the reflected beam of light condensed by the condensing lens 35 can be condensed to such a degree that it passes through this opening portion 34a, and is transmitted therethrough and enters a projection lens 37, and is projected by the projection lens 37 and forms an image on a screen 38.

That is, by the opening portion 34a of the optical path selecting member 34 being made into such a size that it falls within the inside off-illumination area 30, the entire beam of illuminating light is reflected and also, the convergence diameter of the reflected beam of light from the light valve 36 is made smaller than the opening portion 34a, whereby the reflected beam of 10 light is not intercepted on its way but may arrive at the screen 38.

Figure 9:
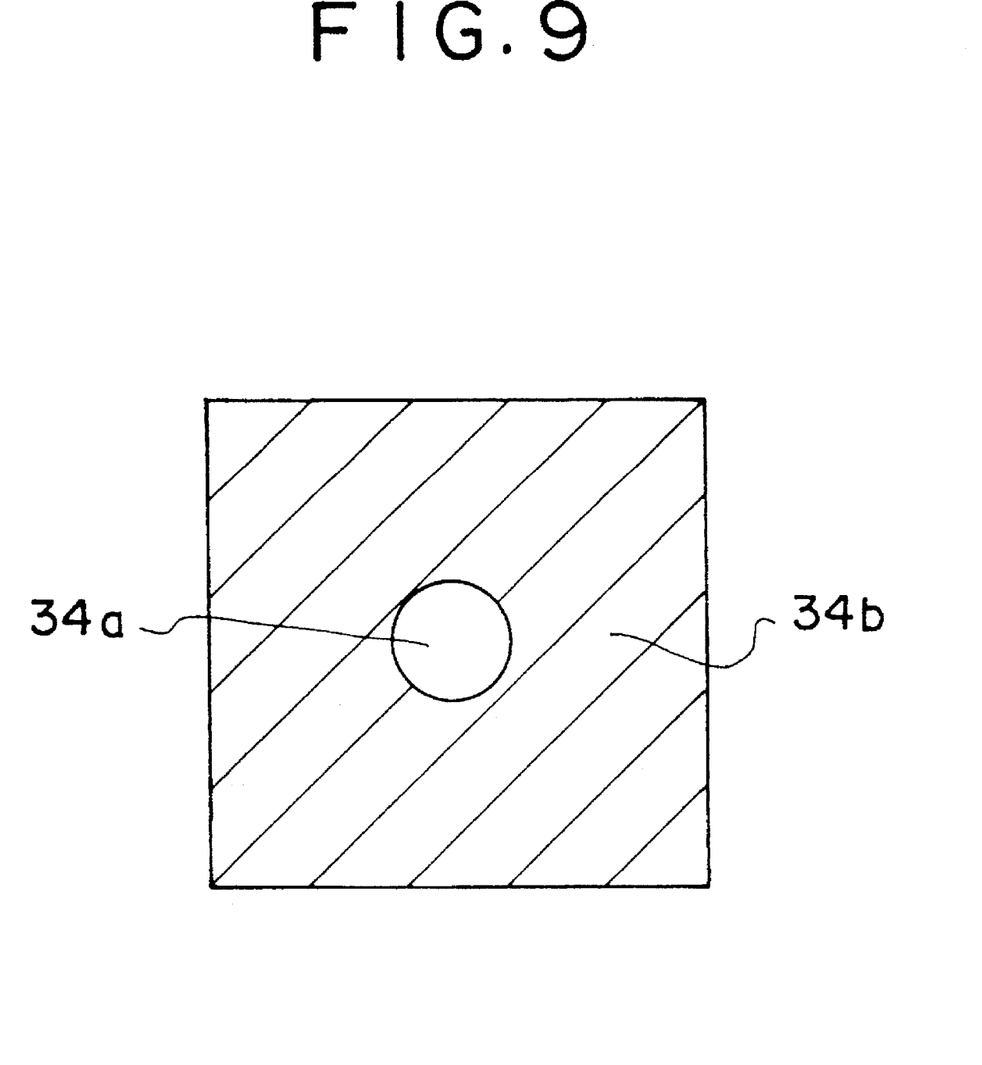
FIG. 9 is a plan view showing the construction of an optical path selecting member in the second embodiment of the present invention.

The optical path selecting member 34 used in the second embodiment is Shown in FIG. 9. In the present embodiment, a portion of a metallic reflecting mirror is hollowed out to form an opening portion, and the opening portion 34a as a transmitting portion is provided substantially at the center of a metallic reflecting mirror substrate 34b indicated by hatching.

The constructions of the optical path selecting members shown in the first and second embodiments are illustrative and are not restrictive if a similar effect is achieved. For example, a similar effect could be achieved even if the optical path selecting member in the second embodiment is one in which a metallic deposited mirror is formed on the portion other than the central portion of a glass substrate, or a mirror having an opening in the central portion thereof on which dielectric material film for reflecting visible light is deposited by evaporation.

As described above, in the projection apparatus according to each embodiment, the illuminating optical system and the projection optical system are separated and combined by the utilization of the inside off-illumination area which is an area in the optical path of the beam of illuminating light through which no ray of light passes and therefore, it never happens that the beam of illuminating light and the reflected beam of light adversely affect each other to cause any loss of the quantity of light.

Further, when the beam of illuminating light is applied to an object such as the light valve, so-called perpendicular incidence is possible and the beam of light reflected therefrom can also be directed in a perpendicular direction and therefore, no distortion is created in the projected image obtained from the reflected beam of light and a good projected image is obtained.

Also, in an apparatus wherein in order to suppress the distortion of an image, a simple half mirror or the like is used to effect the division and combination of an optical path, the loss of the quantity of light has been a great problem. However, in the projection apparatus according to each embodiment, partial (minute) reflection at the light condensing position or the transmitting means is utilized and therefore, nearly 100% of the quantity of light of the beam of illuminating light can be effectively utilized and thus, the intensity of the illuminating light to the light valve becomes strong.

In addition, the reflected light for imaging also becomes one of which the intensity is not lost except by the influence of the aforementioned partial (minute) transmitting area or reflecting area and therefore, a sufficient quantity of projected light can be secured and thus, the brightness and sharpness of the image are improved. There is also the advantage that in order to secure a quantity of projected light similar to that in the prior art, utilization can be made of a light source smaller in the quantity of light than that in the prior art.

Further, such arrangement enables the perpendicular incidence and reflected light to be a reference to the light valve and therefore, the design of the apparatus becomes easy. Also, as compared with the angle adjustment of oblique incidence (reflection) as in the prior art, the assembling and adjusting work during manufacture can be accomplished easily.

What is claimed is:

1. A projection apparatus including:

a light source having a light emitting portion having a finite size;

a concave reflecting mirror for and a condenser lens unit that form light from said light source into a substantially collimated beam of light having an inside off-illumination area through which substantially no light from said light source passes, said concave reflecting mirror condensing light from said light source into a beam of light and said condenser lens unit converting the beam of light from said concave reflecting mirror into the substantially collimated beam of light;

a light valve for reflecting the substantially collimated beam of light from said condenser lens unit and spatially modulating said substantially collimated beam of light on the basis of predetermined image information;

a projection optical system for imaging the spatially modulated beam of light on a surface;

a lens group, disposed between said light valve and said projection optical system, for condensing the spatially modulated beam of light from said light valve into said inside off-illumination area of the substantially collimated beam of light formed by said concave reflecting mirror and said condenser lens unit; and a light dividing element, disposed between said condenser lens unit and said light valve, for directing the substantially collimated beam of light from said condenser lens unit to said light valve and for directing the beam of light condensed by said lens group to said projection optical system.

2. A projection apparatus according to claim 1, wherein said concave reflecting mirror is an elliptical mirror formed with a hole of a predetermined size.

3. A projection apparatus according to claim 2, wherein said light dividing element is disposed at a location substantially conjugate with said hole and is disposed so as to form an inclination of 45° with respect to said light valve.

4. A projection apparatus according to claim 3, wherein said light dividing element has a reflecting area and a transmitting area, said reflecting area being disposed at a location substantially conjugate with said hole.

5. A projection apparatus according to claim 3, wherein said light dividing element has a reflecting area and a transmitting area, said transmitting area being disposed at a location substantially conjugate with said hole.

6. A projection apparatus according to claim 3, wherein said light dividing element has a reflecting surface provided on a part of a light-transmissive substrate.

7. A projection apparatus including:

a light source having a light emitting portion having a finite size;

a concave reflecting mirror having a non-reflecting area of a predetermined shape;

a condenser lens unit;

a light dividing element having a transmitting area and a reflecting area;

a reflection type light valve;

a lens group; and a projection optical system;

the light from said light source being directed to said reflection type light valve via said concave reflecting mirror, said condenser lens unit, said light dividing element and said lens group, in that order, the beam of light reflected by said reflection type light valve being directed to a screen through said lens group and said projection optical system, in that order;

said light dividing element being disposed so that one of said transmitting area and said reflecting area is at a location substantially conjugate with said non-reflecting area of said concave reflecting mirror;

the beam of light reflected by said reflection type light valve and passed through said lens group being condensed into said one area.

8. A projection apparatus according to claim 7, wherein said concave reflecting mirror is an elliptical mirror having a hole therein.

9. A projection apparatus according to claim 7, wherein said one area forms an inclination of 45° with respect to said reflection type light valve.

10. A projection apparatus according to claim 7, wherein said light dividing element has a reflecting surface provided on a part of a light-transmissive substrate.

* * * * *